Feb. 20, 1973  Z. D. RUBEN  3,716,917
PORTABLE ELECTRIC SAW, GRINDER, SANDER OR THE LIKE
Filed Oct. 7, 1970  3 Sheets-Sheet 1

INVENTOR
ZORRO D. RUBEN
by: Wallenstein, Spangenberg, Hattis
& Strampel
ATTYS.

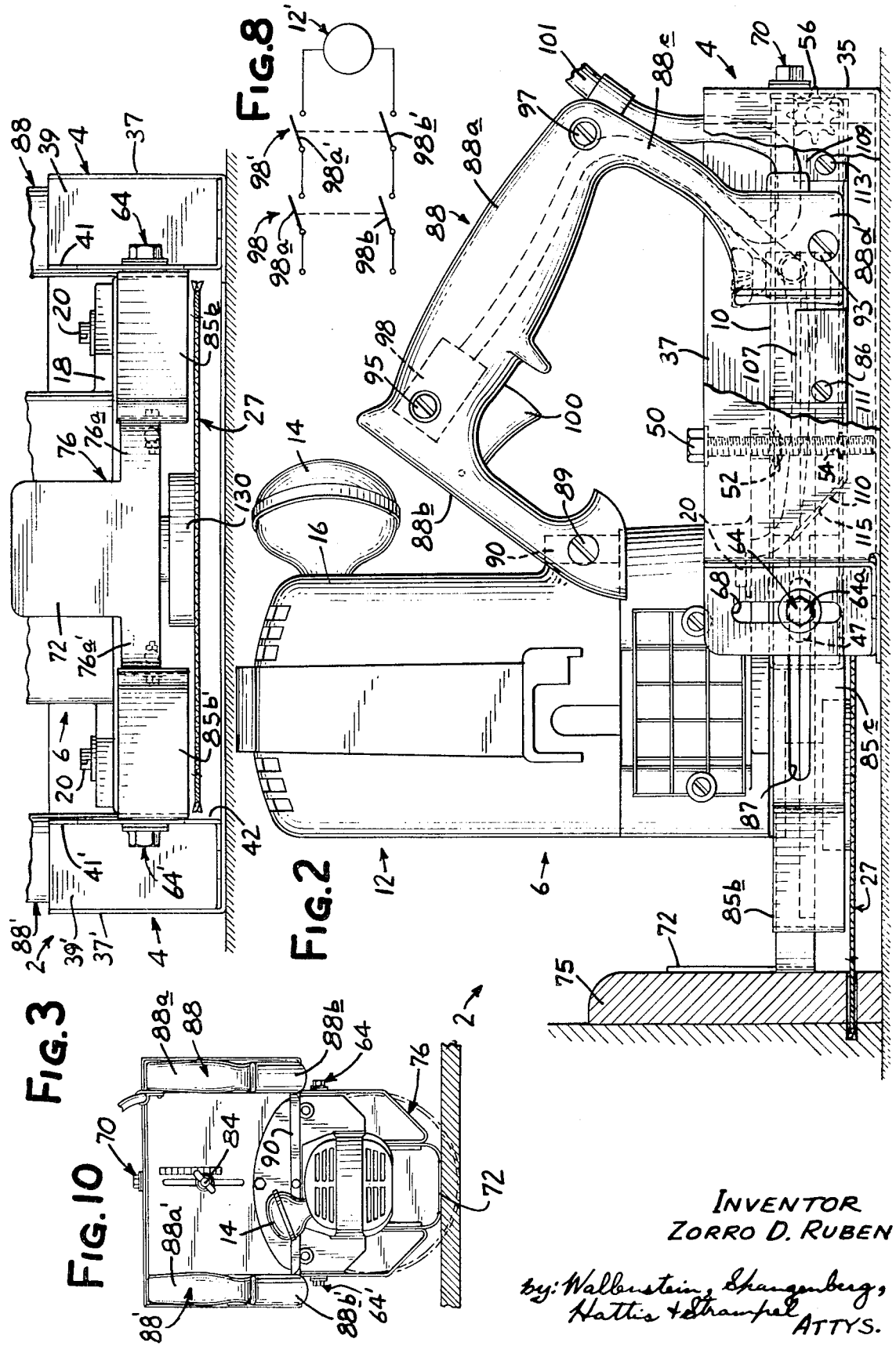

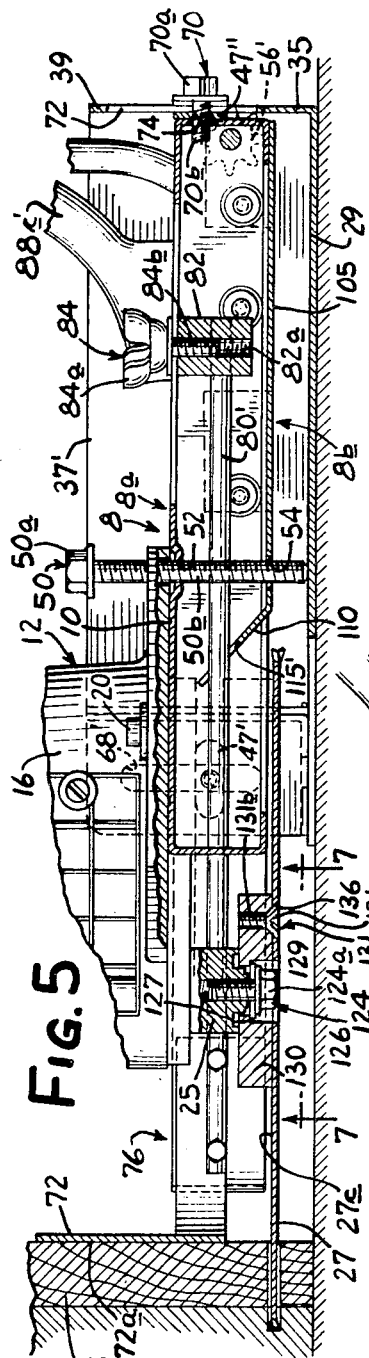

United States Patent Office 3,716,917
Patented Feb. 20, 1973

3,716,917
PORTABLE ELECTRIC SAW, GRINDER, SANDER OR THE LIKE
Zorro D. Ruben, Evanston, Ill.
(8923 Bronx, Skokie, Ill. 60076)
Filed Oct. 7, 1970, Ser. No. 78,832
Int. Cl. B27b 9/02
U.S. Cl. 30—391                                32 Claims

ABSTRACT OF THE DISCLOSURE

A portable machine tool unit comprising a base member having an open-top box-like construction open at the top thereof and having a bottom wall for guiding the machine tool over a floor or other similar surface. A motor and frame assembly is both vertically and tiltably adjustably mounted within the box-like member with the motor and frame assembly being lockable in any one of a number of adjusted positions thereof by tightening suitable fastening means exposed on the outside of the machine tool unit. The motor has a spindle depending from the motor and a circular saw blade, sander, grinder wheel or the like is removably secured to the bottom of the spindle, the various adjusted positions of the motor and frame assembly positioning the circular tool in a variety of possible positions including positions where the front of the tool is located at or slightly below the plane of the bottom surface of the bottom wall of the base member with the remainder of the tool angling rearwardly and upwardly away from the same, and positions where the circular tool has varying elevations preferably above and parallel to the bottom wall of the base member for undercutting doors, jambs and baseboards at various elevations. A pair of widely spaced handlebars positioned preferably as close to the bottom portion of the motor and frame assembly as possible, is provided, the handlebars preferably inclining upwardly and forwardly at an angle in the neighborhood of 45 degrees.

---

This invention relates to portable machine tools having their primary application in the undercutting of doors, in their hanging position, and installed door jambs and baseboards, with a circular saw to provide clearance space for carpeting, tile flooring and the like to extend thereunder, and the sanding or grinding off of irregularities on concrete and floor surfacing.

Portable circular saw units heretofore have been developed which are carried on a frame movable upon and along a floor surface. Some such circular saw units have a circular saw blade carried on the bottom end of the depending spindle of a motor vertically adjustably mounted on the frame to vary the elevation of the saw blade with respect to the bottom of the frame. Such prior circular saw units have been unsatisfactory for a number of reasons. In the first place, they are difficult to handle and manipulate along a floor surface because of the manner in which the handles therefor are shaped and positioned. In the second place, they are difficult to use on floors with surface irregularities when the saw blade involved is moved into a position close to the floor. In such case, it frequently happens that the saw blade touches a protuberance on the floor which makes the successful close undercutting of a door jamb or baseboard difficult if not impossible to achieve because of the resultant friction of the circular saw unit and the damage to the saw blade.

Additionally, the manner of construction of the aforesaid portable circular saw units make them difficult to adjust and they often are unreliable and ineffective in carrying out their intended function for a number of reasons one of which is the fact that because of the manner in which the circular saw blades are secured on the motor spindle they readily become distorted in the process of tightening the mounting screw and during the use thereof.

Portable disk sanders for sanding away surface irregularities at the joints of plywood flooring or disk grinders for grinding away surface irregularities on concrete floors near the walls of a room are generally held aloft during the operation thereof, and so it is a burdensome and difficult task to accurately sand or grind appreciable portions of a floor surface with such devices.

It is one of the objects of the present invention to provide a portable circular saw unit of the type which can be easily moved along the surface of a floor and which provides for vertical adjustability of the distance between the saw blade and the floor in a substantially more easy, effective and reliable manner than is possible with the circular saw units heretofore developed for this purpose. The present invention satisfies this objective by providing a unique, simple, and inexpensively constructed base member and motor carrying frame assembly where the elevation adjustment may be achieved by rotating screw means exposed at the top of the unit, the adjustment being secured by tightening screws or other fastening means exposed on the sides of the base member, and preferably where means are provided for inhibiting at least lateral tilting of the frame during the elevation adjustment.

Another object of the invention is to provide a floor supported rotary saw unit which can be used to undercut door jambs and baseboards close to a floor with irregularities therein, but without the friction with and damage to the circular saw unit by the contact of the saw blade with such irregularities. To this end, another feature of the invention is in mounting the aforesaid motor carrying frame in the base member so that it can be tilted to a point where only the forward edge of the saw blade extends close to the floor. This tilting feature also provides great versatility to the portable machine tool of the invention since it permits the utilization of the unit as a floor sander or grinder. Thus, for sanding applications, a uniquely shaped sanding disk is provided which, when the sanding disk is tilted so it inclines downwardly and forwardly, engages the floor surface over only a narrow arcuate segment thereof so the sanding disk engages the floor without any substantial varying reaction forces which otherwise would make it difficult to move it along a desired path.

Still another object of the invention is to provide a portable machine tool unit of the type which can be moved along a surface of a floor which unit includes a circular tool for undercutting doors, door jambs and baseboards or for sanding or grinding irregularities on a floor, which unit includes uniquely constructed and oriented handle means which enable the user to grip the same more easily and securely, and to control without difficulty the path of movement of the machine tool unit over a floor, despite the usual presence of substantial varying reaction forces which tend to oppose such movement. Thus, another feature of the invention is the provision in a portable machine tool of the type described where it is to be moved over a floor surface of a pair of handles relatively widely horizontally spaced apart and attached to the unit near the bottom portion thereof, the handles presenting relatively narrow forwardly extending upper surfaces which can be grasped in the palms of the user's hands so he can easily and effectively apply a force upon the machine tool unit having both downward and horizontal components which overcome the varying reaction forces involved. These handles are most advantageously handlebars extending forwardly and upwardly at an angle of approximately 45 degrees so that the user when kneeling on the floor can completely encircle the handlebars with his wrists in a comfortable unbent position (i.e. with the hands extending generally in a straight line from the axis of the arms) where the user can readily, comfortably and securely grip the handlebars and apply the force necessary to move the unit over the desired path.

Still another object of the invention is to provide, in a portable machine tool unit of the type described, a unique mounting for a saw blade which receives a screw recessed within the saw blade, which mounting, among other things, distributes the force applied to the saw blade to avoid the deformation of the saw blade during the process of mounting the saw blade on the motor spindle and during the use thereof. To this end, the saw blade is provided with a hub attached to the upper surface thereof, most advantageously by three or more screws whose heads fit into countersunk openings in the outer surface of the saw blade. The hub has a central opening aligned with the central opening of the saw blade, the opening in the hub having a downwardly facing annular shoulder which receives the force of the head of a mounting screw recessed within the blade and hub openings and threading into the motor spindle. Thus, the force of the mounting screw is applied directly to the hub rather than to the defining walls of the central opening of the saw blade, and the forces applied to the saw blade at the points of connection of the saw blade to the hub are distributed over an appreciable area rather than at the periphery of the central opening of the saw blade. Also, the hub can be removed from the saw blade to enable the saw blade to be sharpened using conventional saw blade sharpening equipment.

A further object of the invention is to provide a portable machine tool which accomplishes any one and preferably all of the aforementioned objectives and which has a simple and economical construction.

The above and other objects, advantages and features of the invention will become apparent upon making reference to the specification to follow, the claims and the drawings wherein:

FIG. 2 is a side elevational view, partly broken away, of the portable circular saw unit of FIG. 1 in the process of undercutting a baseboard;

FIG. 3 is a fragmentary front elevational view of the portable circular saw unit of FIGS. 1 and 2;

FIG. 5 is a longitudinal sectional view through the circular saw unit of FIG. 1 in the process of undercutting a baseboard, taken along section line 5—5 in FIG. 1;

FIG. 6 is a fragmentary sectional view through the portable circular saw unit of FIG. 1, taken along the section line 6—6 therein;

FIG. 7 is a fragmentary bottom plan view of the circular saw blade used in the portable circular saw unit of FIGS. 1–5;

FIG. 8 is a schematic diagram of the power circuit for energizing the electric motor forming part of the portable circular saw unit of FIG. 1;

FIG. 9 is a top plan view of the circular saw unit of FIGS. 1–5 when the unit is being used to undercut baseboards at the corner of a room;

FIG. 9A is a perspective view of the handle portion of the circular saw unit of FIGS. 1–5 showing the position of the user's hands and arms on the handles while kneeling on the floor to operate the saw unit;

FIG. 10 illustrates the use of the portable circular saw unit shows in FIGS. 1–5 for an application where the unit is guided over a vertical wall surface rather than the floor and the process of forming a vertical cut in a wooden floor at the wall line of the room involved;

Figures 1, 4:
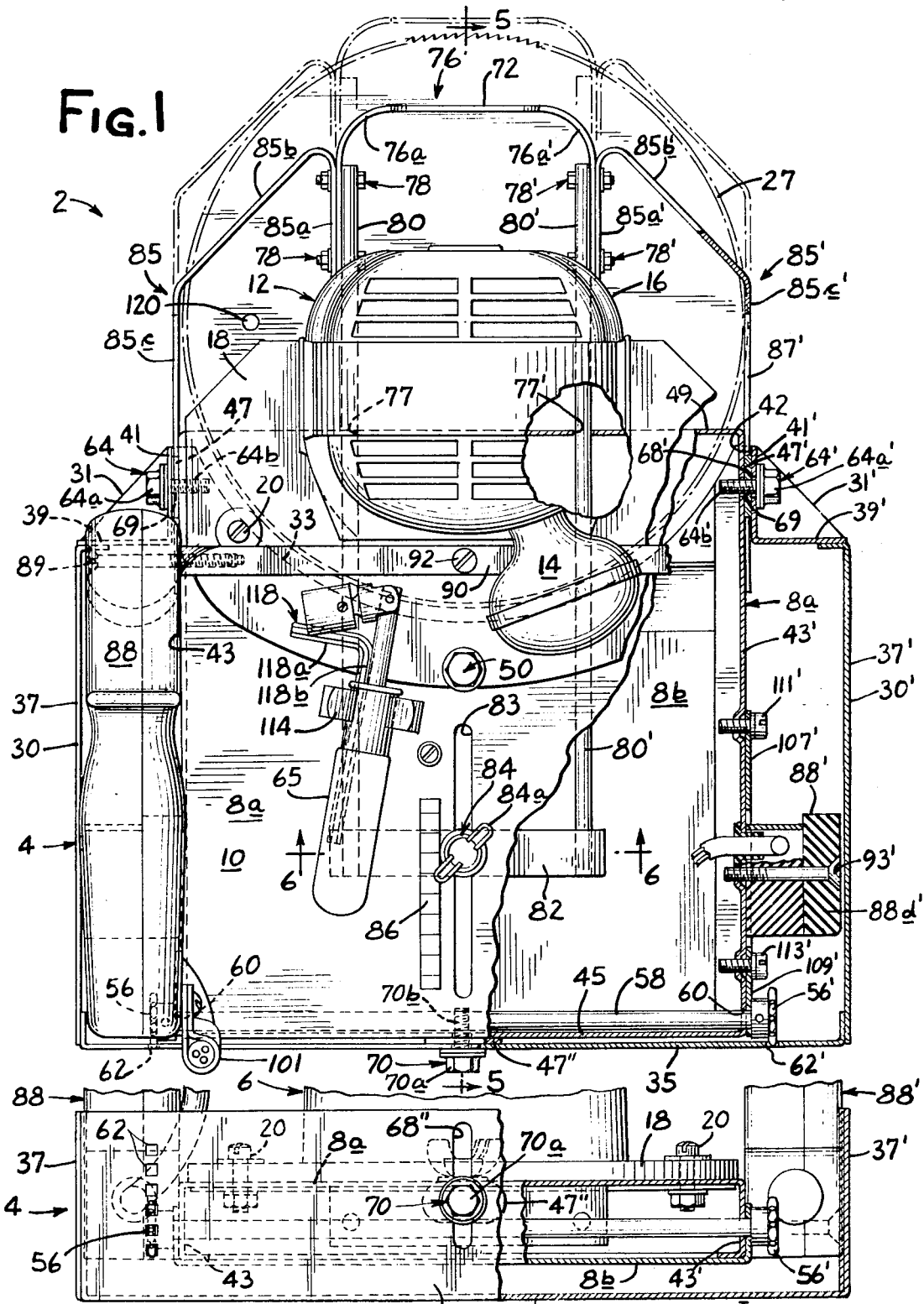
FIG. 1 is a top plan view, partly broken away, of the most preferred exemplary form of the portable circular saw unit of the invention.
FIG. 4 is a fragmentary rear elevational view, partly broken away, of the rear portion of the circular saw unit of FIGS. 1–3.

FIG. 11 illustrates diagramatically an application of the portable circular saw unit shown in FIGS. 1–5 used on a rough surfaced concrete floor and where the circular saw blade used in FIGS. 1–5 is replaced by a different circular saw blade and where the saw blade is tilted to bring the front edge of the circular saw blade as close to the floor as possible while clearing obstructions or protuberances on a concrete floor;

FIG. 12 is a greatly enlarged fragmentary sectional view of the teeth of the circular saw blade as shown in FIG. 11;

FIG. 13 is a diagrammatic view of an application of the machine tool unit shown in FIGS. 1–5 when the circular saw blade is replaced by a sanding disk to convert the equipment to a floor mounted and guided floor sanding unit;

FIG. 14 is a vertical sectional view through the sanding disk shown in FIG. 13 illustrating the construction thereof and the manner of mounting the same to the spindle of the portable machine tool unit; and FIG. 15 is a fragmentary bottom plan view, partly broken away, of the sanding disk shown in FIGS. 13 and 14.

Referring now more particularly to FIGS. 1–5, a portable circular saw unit is thereshown generally indicated by reference numeral 2. The circular saw unit thereshown includes an open-top box-like rectangular base member 4 preferably made of sheet metal. Mounted for vertical adjustment in the base member 4 is a motor and frame assembly generally indicated by reference numeral 6. In the most preferred form of the invention illustrated, the motor and frame assembly 6 is constrained against lateral tilting movement during the adjustment thereof. However, this assembly can be adjustably tilted over narrow limits in a forward and rearward direction for certain specific applications of the unit to be described.

The motor and frame assembly 6 includes a rectangular frame assembly 8 preferably made of sheet metal and including an open bottom frame member 8a with the open bottom partially covered by a cover member 8b. Mounted on the front portion of the top wall 10 of the frame member 8a is a motor unit generally indicated by reference numeral 12. The motor unit 12 illustrated is similar to commercially available circular saw units not practically useable for the door, door jamb and baseboard undercutting or the sanding and grinding operations performed by the present invention. A bulb-shaped handle 14 projects from a generally upwardly extending motor housing 16. The motor housing has a flange 18 at the bottom thereof which is anchored by bolt and nut assemblies 20—20 to the top wall 10 of the frame member 8a. Depending from the motor housing 16 below the level of the frame top wall 10 is a spindle 25 (FIG. 5) to which a rotary saw blade 27 is attached in a manner to be described. For most applications, the spindle 25 will extend in a vertical direction so the circular saw blade 27 extends in a horizontal plane, as illustrated best in FIG. 5 where it projects forwardly from the rest of the circular saw unit.

The bottom wall 29 of the base member as illustrated has parallel side margins 30–30' (FIG. 1) terminating at the front thereof in forwardly and inwardly inclined margins 31–31' the forward ends of which merge with a concave circular front margin 33 following a line slightly outwardly of the margin of the circular saw blade 27. Vertical side walls 37–37' extend upwardly from the parallel side margins 30–30' of the bottom wall which terminate at the rear thereof in a vertical rear wall 35. The front of the side walls 37–37' terminate in short inwardly extending front wall portions 39–39' in turn terminating in short forwardly extending side wall portions 41–41' defining an opening 42 into the front end of the base member 4.

The frame member 8a has depending parallel vertical side walls 43–43' which are spaced apart a distance slightly less than the spacing between the front side wall portions 41–41' of the base member 4. The rear of the vertical side walls 43–43' merge with a vertical rear wall 45 which is spaced in spaced relation to the rear wall 35 of the base member 4 by a horizontally elongated boss 47" welded or otherwise secured in a centered position on the rear wall 45 of the frame member 8a to provide a fulcrum or pivot for the frame member 8a so the frame member can pivot over a limited angle to vary the spacing of the front and rear portions of the frame member 8a with respect to the bottom wall 29 of the base member 4.

The vertical side walls 43–43' of the frame member 8a extend forwardly between the side wall portions 41–41' in spaced relation thereto and terminate in a front wall 49 (FIG. 1). Spaces are left between the outer surfaces of the side walls 43–43' of the frame member 8a and the front side wall portions 41–41' of the base member. A pair of bosses 47–47' are secured to the outer sides of the vertical side walls 43–43' to span these spaces over narrow horizontally elongated segments.

Prior to the tightening of fastening means to be described, as previously indicated, the entire motor and frame assembly 6 can be adjusted to different vertical positions within the base member where the top wall 10 of the frame member 8a is selectively parallel or inclined with respect to the bottom wall 29 of the base member 4. The adjustment of the elevation of the frame member 8a within the base member is most conveniently adjusted by an adjusting screw 50 having a head 50a positioned above the frame top wall 10 so it can readily be grasped and turned, a shank 50b which passes through the motor flange 18 and threads into a threaded opening 52 in the top wall 10 of the frame member 8a. The shank 50b of the screw 50 passes through an opening 54 in the cover member 8b and bears against the upper surface of the bottom wall 29 of the base member 4. It can thus be seen that as the adjusting screw 50 is turned and threads a greater or lesser amount into the threaded opening 52 of the frame member 8a, the elevation of the point of the frame member at which the adjusting screw is located will vary. Although two or more such screw means could be used spaced apart and near the outer edges of the frame member 8a, it is most convenient in this preferred embodiment to provide only one such screw 50 centered with respect to the frame member 8a as best illustrated in FIG. 1. The frame member 8a can be tilted forwardly or backwardly over a small angle so the front and rear ends of the frame member 8a have slightly different elevations relative to the point of the frame member carrying the screw 50.

It is most helpful to provide means for preventing the lateral tilting of the frame member 8a so that corresponding points on the sides of the frame member will have substantially identical elevations relative to the base member. To this end, in the most preferred form of the invention, frame tilting preventing means are preferably provided most advantageously in the form of a pair of sprockets 56–56' secured to the opposite ends of a shaft 58 mounted for free rotation within the side walls 43–43' of the frame member 8a. The shaft 58 passes outwardly through openings 60–60' in the side walls 43–43' of the frame and cover and the sprockets 56–56' are secured to the shaft 58 on the outside of the side walls 43–43'. The teeth of the sprockets 56–56' pass within a pair of vertically spaced sets of apertures 62–62' formed in the rear wall 39 of the base member, as best seen in FIGS. 1 and 4. The teeth of the sprockets 56–56' extending into the apertures 62–62' prevent any significant lateral tilting of the frame member 8a over a range of elevations of the frame member 8a.

Fastening screws 64–64' are provided for locking the front end of the frame member in a given adjusted position. The crews 64–64' illustrated have hexagonal heads 64a–64a' or the like which are engaged by a socket wrench 65 or the like and threaded shanks 64b–64b' which pass loosely through a pair of vertically elongated slots 68–68' (FIG. 2) formed in the front side wall portions 41–41' of the base member 4 and threading into threaded holes 69–69' formed in the bosses 47–47' attached to the side walls 43–43' of the frame member 8a. It can be seen that when the screw heads 64a–64a' are tightened, this draws the outer faces of the bosses 47–47' tightly against the interfaces of the side wall portions 41–41' to prevent relative movement between the walls involved.

Means are provided for locking the rear end of the frame member 8a in an adjusted position. To this end, a fastening screw 70 is provided at the rear of the base member having a hexagonal head portion 70a exposed on the outside of the base member to receive the socket wrench 65 and a threaded shank portion 70b (FIG. 5) which passes freely through a vertically elongated slot 68" in the rear wall 35 of the base member and threads into a threaded hole 74 in the aforementioned boss 47" secured to the rear wall 45 of the frame member 8a.

The position of the frame member 8a can be adjusted by loosening the fastening means 64–64' and 70 and adjusting the screws 50 and 70 while using a ruler to measure the spacing between the saw blade and bottom surface of the base member where a horizontal orientation of the saw blade is desired and then tightening the three fastening screws to lock the frame member in this adjusted position. When it is desired to tilt the plane of the saw bladle, the adjustment can be made by loosening only the screws 64–64' and retracting the screw 50. The narrow height at boss 47" allows the limited but sufficient amount of flexing of the rear wall 35 of the base member 4 to accomplish the required tilt without the need for loosening the fastener 70.

In order to use the rotary saw 2 effectively, it is necessary to have a depth-of-cut adjusting means so that the saw blade 27 will cut the proper distance into and beyond the member being cut and so be guided along a wall surface to be undercut. To this end, a vertical abutment member 72 is provided at the front of the motor housing 16 and above the level of the circular saw blade 27, which abutment member presents a vertical front face 72a which can abut against a baseboard, door or door jamb etc. to be undercut. FIGS. 2 and 5 show a baseboard 75 against which the front face 72a of the abutment member 72 bears. The abutment member 72 is part of a framework generally indicated by reference numeral 76 which includes side arms 76–76a' secured by bolt and nut assemblies 78–78' to a pair of horizontally spaced rods 80–80' which pass beneath the motor unit housing 16 and slidably extend through openings 77–77' in the front wall 49 of the frame member 8a. The rear ends of the rods 80–80' are suitably anchored within openings in a crossbar 82. A depth-of-cut adjusting screw 84 is provided having a wing-shaped head 84a and a threaded shank 84b which passes through a longitudinally extending slot 83 in the rear portion of the top wall 10 of the frame member 8a. The threaded shank 84b of the adjusting screw 84 threads into a threaded bore 82a in the crossbar 82 so that tightening of the wing-shaped head 84a will lock the framework 76 in any adjusted position thereof. The used can vary the position of the abutment member 72 when adjusting screw 84 is loosened by pushing or pulling on the projecting wing-shaped screw head 84a to bring the abutment wall 72 to the desired position rearwardly of the forward edge of the circular saw blade 27. A series of spaced reference lines 86 are provided to indicate the depth of cut achieved by the various positions of the screw head 84a.

Associated with the depth-of-cut adjustment means just described are guard rail means for minimizing the possibility that a part of the user's body will come into contact with the sides of the circular saw blade 27. These guard rail means comprise guard rail members 85–85' having rearwardly extending end portions 85–85' secured by the bolt and nut assemblies 78–78′ previously described to the front ends of the rods 80–80′. The front ends of the rearwardly extending end portions 85a–85a′ of the guard rail member 85–85′ terminate in rearwardly and outwardly inclining portions 85b–85b′ which respectively extend at right angles to one another for reasons to be explained. The rear ends of he rearwardly and outwardly inclining portions 85b–85b′ of the guard member 85–85′ terminate in rearwardly extending parallel portions 85c–85c′ which have horizontally elongated slots 87–87′ therein which receive the threaded shanks 64b–64b′ of the fastening screws 64–64′. The aformentioned bosses 47–47′ project through the elongated slots provided in the rearwardly extending parallel portions 85c–85c′ of the guard members 85–85′ which have a thickness less than the aforementioned clearance spaces between the confronting surfaces of the side wall portions 41–41′ of the base member 4 and the side walls 43–43′ of the frame member 8a so that the entire assembly of the abutment member 72, the supporting framework 76 and the guard rail members 85–85′ can be moved freely back and forth when the adjusting screw 84 is loosened and the fastening screws 64–64′ remain tightened.

When the circular saw unit is not in use, the guard members 85–85′ should be in their furthest extended position as shown in dashed lines in FIG. 1 where the guard members and the abutment member 72 extend just slightly outwardly of the periphery of the circular saw blade 27 to give maximum protection. During the operation of the rotary saw blade 27, manifestly the abutment member 72 and the guard members 85–85′ must be rearwardly of the portion of the blade which is to undercut the door, door jamb or baseboard involved. However, the exposed portions of the rearwardly extending portions 85c–85c′ of the guard members will act as a guard surface to be engaged by a user's hand or the like brought inadvertently against the side of the circular saw unit near the level of the floor. When the guard members 85–85′ are in their fully retracted positions as shown in FIG. 9, the circular saw unit can be pushed to the furthest degree into a corner of a room where the walls of the room will be engaged by the rearwardly and outwardly inclining portions 85b–85b′ of the guard members, which then limit the degree to which the saw blade undercuts and extends beyond the baseboards involved to the extent desired.

The portable circular saw unit 2 can be easily and comfortably and easily moved along a floor surface during the process of undercutting a door, baseboard or door jamb due to the provision of a pair of horizontally spaced handles 88–88′. The handles 88–88′ include rounded handlebars 88a–88a′ presenting narrow forwardly and upwardly extending top surfaces preferably inclining at a 45 degree angle, against which surface the palms of the user's hands can bear, as best shown in FIG. 9A, where the hands of the user extend in a straight line with his arms so that the handles can be readily comfortably grasped and the proper forces readily applied to control the movement of the circular saw unit. The handles 88–88′ are positioned as far apart as possible but within lines extending along the rearwardly and outwardly inclining portions 85b–85b′ of the guard members 85–85′ when the guard members are in their fully retracted position, as shown in FIG. 9. Also, the handles 88–88′ are most advantageously located at the lowest possible position as is practical to minimize reaction couples acting against the circular saw unit when in use. With the handlebars 88a–88a′ extending at an angle of 45 degrees, when the unit is guided on a vertical wall surface as shown in FIG. 10 where the circular saw unit is used to cut into a floor along the wall line, the handles extend at the same convenient angles as described where the user can grasp the same in a position where his hands extend in a straight line from his arms. The upper and lower ends of the handlebars 88a–88a′ respectively terminate in downwardly and forwardly extending handle portions 88b–88c and 88b′–88c′. The bottom ends of the handle portions 88b–88b′ are secured by screws like 89 to the end faces of a crossbar 90. The bottom ends of the handle portions 88c–88c′ terminate in enlarged base portions 88d–88d′. The base portions 88d–88d′ of the handles 88—88 are secured to the outside of the vertical side walls 43–43′ of the frame members 8a by screws 93–93′. The handles 88–88′ as described can each be made of two hollow confronting molded parts held together initially by screws like screws 95 and 97 shown in FIG. 2, so that switch units 98–98′ (FIG. 8) having switch actuating levers like lever 100 in FIG. 2 can be mounted within the cavity formed in the handles with the activating levers projecting from the bottom of the associated handlebars. The switch units 98–98′ are double pole, single throw switches including movable normally open contact poles 98a–98a′ connected in series with one of the terminals of an electric motor 12′ forming part of the motor unit 12, and movable normally open contact poles 98b–98b′ connected in series with the other terminal of the electric motor 12′. Thus, the electric motor 12′ can only be energized when both of the switch units 98–98′ are actuated by the squeezing of the actuating levers projecting from the bottom of the handlebars 88a–88a′ so if the user holds up the circular saw unit by grasping only one of the handles as may occur or releases one hand from the saw unit, the electric motor 12′ will not be energized to create a hazardous condition for the user.

As best shown in FIG. 2, a power cord 101 is provided which enters the base portion 88d of the handle 88. Two conductors (not shown) extend through the hollow portion of the handle 88 to make connection with the switch unit 98 therein. Other conductors extend laterally across the frame member 8a below the top wall 10 thereof to pass into the other hollow handle 88′ to make connection with the associated switch unit 98′. Extensions of the conductors described connect with the electric motor 12′ within the motor housing 16.

The cover member 8b which closes off the open bottom of the frame member 8a, as illustrated, includes a bottom wall 105 having at the sides thereof pairs of upwardly extending securing lugs 107–107′ and 109–109′ (FIGS. 1 and 2) which securing lugs receive fastening screws 111–111′ and 113–113′ passing through the lugs involved and threading into the adjacent side walls of the frame member 8a. The bottom wall 105 of the cover member 8b terminates in an upwardly extending wall portion 110 which has notched apertures 115–115′ (FIGS. 2 and 5) through which the associated rods 80–80′ associated with the framework 75 may pass.

A spring clip unit 114 may be secured to the top wall 10 of the frame member 8a immovably to receive the socket wrench 65 and an Allen wrench 118 used as a saw blade position stop member. The Allen wrench 118 has a leg 118a or 118b adapted to fit into an opening 120 (FIG. 7) in the circular saw blade 27 where it will strike against some part of the circular saw unit to prevent the saw blade from rotating to permit the socket wrench to be used to release or tighten a mounting screw 124 holding the circular saw blade 27 upon the motor spindle 25.

As previously indicated, a unique mounting of the circular saw blade 27 is provided which reduces the stresses applied to the saw blade during the securing thereof to the spindle 25 and during the time the saw blade is in the process of cutting through a body of material. To this end, the mounting screw 124 is related to the saw blade 27 in such way that the head 124a thereof applies a securing force to a downwardly facing annular shoulder 127 in the central opening 129 provided in a relatively thick rigid hub member 130 secured to the upper face 27c of the saw blade at a number of points, such as through three circumferentially spaced screws 131. Thus, the force applied on the tightening of the mounting screw contact with the floor over only a limited segment thereof.

4. The portable machine tool unit of claim 1 wherein said circular tool is a circular saw blade projecting forwardly of the rest of the machine tool unit, the planes in which the teeth of the saw blade extend alternate between the general plane of the saw blade and a plane extending upwardly therefrom, so the saw blade is devoid of downwardly set saw teeth which can contact irregularities in the floor surface.

5. The portable machine tool unit of claim 1 wherein said handle means comprise horizontally spaced handle members presenting narrow, forwardly and upwardly extending surfaces to be engaged by the palms of the user's hands.

6. A portable circular saw unit comprising: a base member having a bottom for guiding and supporting the machine tool over a floor, vertical wall means at the front of said base member and vertical wall means at the rear of said base member; a motor and frame assembly vertically adjustable mounted within said vertical wall means of said base member, said motor and frame assembly including a frame having a top wall and vertical wall means at the front thereof in confronting relation within said vertical wall means at the front of said base member and vertical wall means at the rear of said frame in confronting relation within said vertical wall means at the rear of said base member, and a motor supported upon the front portion of said top wall of said frame which motor has a generally vertically extending spindle depending to a point below the top wall of said frame; and a circular saw blade carried at the bottom of said spindle so the saw blade extends transversely of said spindle and projects forwardly of the rest of the machine tool unit; said motor and frame assembly being vertically adjustably supported on said base member so the position of said circular saw blade is adjustable between a position contiguous to the plane of the bottom of said base member to positions spaced progressively above this position; and at least three widely spaced manually releasable fastening means extending between said confronting vertical wall means at the front and rear of said base member frame for locking said frame into any one of a number of selected adjusted positions thereof; and handle means to be grasped by the user for moving the circular saw blade unit along the floor surface on said base member.

7. The portable circular saw unit of claim 6 wherein said base member is an open-top rectangular box-like unit in which said motor carrying frame also of rectangular configuration is adjustably mounted.

8. The portable circular saw unit of claim 7 wherein said confronting vertical wall means of said base member and said frame being vertical side walls on the opposite sides of the base member and frame at the front thereof and rear walls of said base member and frame, two of said fastening means extending between said vertical walls on the opposite sides of said base member and frame.

9. The portable circular saw unit of claim 7 wherein the front and rear portions of said frame respectively are adjustable to different elevations with respect to said base member to effect the forward, downward tilting of said saw blade with respect to the bottom of said base member.

10. The portable circular saw unit of claim 6 provided with a depth-of-cut adjusting means including vertically extending abutment wall means to engage a vertical wall surface to be undercut and positioned above the portion of the saw blade projecting from the circular saw unit and a support framework for said abutment wall means extending into and supported for horizontal forward and rearward adjustment with respect to said frame, said support framework of said abutment wall means having a rear portion extending upwardly through a longitudinally extending aperture in the top wall of said frame where it can be grasped to impart forward or rearward movement thereof with respect to said frame, and fastening means exposed on the top wall of the frame for locking said upwardly extending portion of said support framework in any one of a number of adjusted portions thereof.

11. The portable circular saw unit of claim 10 wherein there is connected to said vertical abutment means laterally spaced guard rails extending immediately above the plane of the upper surface of said saw blade and beyond the side extremities thereof.

12. The portable circular saw unit of claim 11 wherein said guard rails extend in spaces between the vertical wall means at the front of said base member and frame, said fastening means extending between the vertical wall means of said base member and frame to draw the same together, said guard rails being free to move within said spaces when said vertical wall means are drawn together.

13. A circular saw unit comprising a base member having a bottom wall for guiding the machine tool over the floor; a frame mounted for vertical adjustment on said base member; a motor mounted on the front portion of said frame for up and down movement therewith, the motor having a spindle depending therefrom to a point adjacent but spaced above the plane of the bottom surface of said base member, said spindle adapted to receive a circular saw blade projecting forwardly from the machine tool unit generally in a plane transverse to the axis of the spindle; a depth-of-cut adjusting means including vertically extending abutment wall means to engage a vertical wall surface to be undercut and positioned above the portion of the saw blade projecting from the circular saw unit, and a support framework for said abutment wall means extending into and supported for horizontal forward and rearward adjustment with respect to said frame, said support framework of said abutment wall means having a rear portion extending upwardly through an aperture in the frame where it can be grasped to impart forward or rearward movement thereof with respect to said frame, and fastening means exposed on the top of the frame for locking said upwardly extending portion of said support framework in any one of a number of adjusted portions thereof.

14. A portable machine tool unit comprising a base member having a bottom wall for guiding the machine tool unit on a floor or a vertical wall, a motor mounted on said base member, the motor having a spindle which, when said bottom wall of said base member is guided on a floor, depends therefrom to a point adjacent but spaced above the plane of the bottom surface of said base member, said spindle adapted to receive a circular tool projecting forwardly from the machine tool unit generally in a plane transverse to the axis of the spindle, and means to be grasped by the user selectively to impel the machine tool unit over a floor or a vertical wall as said bottom wall of the base member guides the same for movement thereon, said means comprising a pair of horizontally spaced handles adapted to be grasped by the two hands of the user and presenting relatively narrow upwardly facing surfaces to be engaged by the palms of the user's hands, said upwardly facing surfaces of said handles inclining at a substantial angle upwardly and forwardly from the machine tool both when said bottom wall of said base member is guided on said floor and when said bottom wall of said base member is guided on a vertical wall, so the user's hands grasping the same extend roughly in a straight line forwardly from the axes of the user's arms whether the base member is guided on the floor or a vertical wall.

15. The portable machine tool unit of claim 14 wherein haid handles are elongated bars adapted comfortably to be encircled by the user's hands.

16. The portable machine tool unit of claim 14 wherein said circular tool is a circular saw blade.

17. The portable machine tool unit of claim 14 wherein said handles are located rearwardly of at least the front half of the circular tool at a point adjacent the bottom 124 is not applied to and thus cannot distort the saw blade. Each of the screws 131 has a head 131a fitting into a countersink 136 formed in the lower faces of the saw blade 27 and the hub 130 and a threaded shank 131b which threads into the hub member 130. The saw blade 27 has a central opening 125 in alignment with the central opening 129 in the hub member 130 and when the mounting screw 124 is fully threaded into the spindle 25 the head 124a of the screw is completely recessed within the bottom surface of the saw blade 27. A washer 126 is shown extending between the screw head 124a and the shoulder 127.

When the mounting screw 124 is tightened, the forces involved applied by the head portion of the screw are thus applied to the hub member 130 rather than to the saw blade 27. Also, reaction forces applied to the saw blade when the saw balde is cutting through a body of material are coupled to the hub member 130 over a number of points, namely the points at which the screws 131 engage the hub 130. Although the hub member 130 could be welded to the saw blade 27, it is most desirable that the hub member be removably attached to the saw blade so that the saw blade can be disconnected from the hub member so that the saw blade can be sharpened using conventional saw blade sharpening equipment.

Refer now to FIG. 11 which diagrammatically illustrates the use of the circular saw unit illustrated in FIGS. 1–5 with a modified saw blade 27' tilted downwardly and forwardly to cut a baseboard 75 very close to a concrete floor 133 having a somewhat irregular surface which could interfere with a sawing operating if the saw blade were to be oriented horizontally and close to the irregular concrete floor 133. In such case, the portion of the saw blade rearwardly of the front edge thereof angles rearwardly and upwardly to clear the irregularities in the concete floor surface. This application of the invention, most desirably uses a modified saw blade 27'. As best shown in FIG. 12 the modified saw blade 27' where with the adjacent teeth such as 27a and 27b are respectively alternately positioned in the general plane of the saw blade and plane slightly angling upwardly from the plane thereof, so that none of the saw teeth are set downwardly as in the case of the conventional saw blade 27 where the teeth are alternately set above and below the general plane of saw blades. This further minimizes the possibility that the teeth of the saw blade will strike irregularities in the floor surface.

The previous feature of the circular saw unit 2 which permits the motor and frame assembly to be tilted forwardly and rearwardly permits the unit to adjust to be used as a floor supported sander or grinder. Refer now to FIG. 13 which shows a sanding disk 27" substituted for the circular saw blade 27 or 27' and the motor and frame assembly tilted to a degree where the forward portion of the sanding disk engages a floor surface 133' to be sanded. The sanding disk 27" is preferably provided with a slightly tapered or conical bottom surface 27a" so that the sanding disk will engage the surface of the floor 133' along only a narrow segment or radial line 134.

FIG. 14 illustrates the construction of the sanding disk 27". As thereshown, the sanding disk includes a slightly tapered conical carrier disk 135 to which is adhesively or otherwise secured an outer layer 137 of paper, cloth or the like to which sand particles or the like are adhesively secured. Prior to the application of outer layer 137 to the carrier disk 135 the disk is secured to a unique relatively thick and rigid hub member 139 having a conically shaped bottom surface 139a corresponding to the desired conical shape of the sanding disk 27". Initially, the carrier disk 135 does not have a conical shape. As shown in FIG. 15, the carrier disk 135 and hub 139 have three circumferentially spaced countersunk openings 140 within which are recessed the heads 142a of respective flathead screws 142. The screws 142 have threaded shanks 142b which thread into threaded bores 139b in hub member 139. The tightening of the screws 142 applies pressure to the carrier disk 135 to cause the disk to conform substantially to the conical shape of the bottom hub surface 139a. For the purpose of the present invention, it is most advantageous that the angle which the contacting line 134 of the sanding disk 27" makes with a plane transverse to the axis of rotation of the sanding disk is relatively small, for example about 2 degrees. The sanding disk 27" has a central opening 141 in alignment with a central opening 146 in the hub 139. A downwardly facing shoulder 148 is provided within the opening 146 to form a shoulder against which the force of the head 124a of the aforementioned mounting screw 124 is applied to anchor the sanding disk to the spindle 25.

It is apparent that a grinding wheel can replace the sanding disk 27" to form a floor supported grinder for grinding, for example, irregular surfaces of a concrete floor. A grinding wheel, which commonly comprises a relatively thick body of grinding material imbedded in or carried by a suitable binder, can be a commercial grinding wheel to which a suitable hub is connected for receiving the force of a mounted screw 124 as described. The grinding wheels do not need to have the originally conical shape of the sanding disk 27". By tilting the frame 8a in the base member 4, so that the grinding wheel outer edge is slightly downward in the machine tool unit 2 of the invention, a conical shape is developed rapidly, the grinding wheel wearing that way as it is rotated against the surface to be ground.

It is thus apparent that the present invention has provided an exceedingly versatile, easy to adjust and use, portable floor mounted machine tool unit capable of undercutting, sanding or grinding operations.

It should be understood that numerous modifications may be made to the present form of the invention described above, without deviating from the broader aspects of the invention.

What is claimed is:

1. A portable machine tool unit comprising: a base member having floor engaging surface means which stably support the machine tool unit for movement along a floor or the like; a frame; a motor carried by the frame and having a depending spindle to be driven by the motor; a circular tool carried at the bottom of the spindle, the circular tool having a relatively narrow dimension axially of the spindle and extending generally transversely of the axis of the spindle; means for selectively forwardly tiltably and vertically adjustably mounting said assembly of the motor and frame upon said base member while said floor engaging surface means remains in the same initial stable contact with the floor so said circular tool can be selectively securely positioned to extend in a plane roughly parallel and contiguous to the bottom of said base member and in a number of planes above the same and also in a forwardly and downwardly inclined plane where the front edge portion of the circular tool is above but contiguous to the bottom of said base member with the portions of the cutting tool rearwardly thereof inclining rearwardly and upwardly away from the front edge portion of said circular tool to avoid irregularities in the floor; and handle means to be grasped by the user for moving the machine tool unit along the floor.

2. The portable machine tool unit of claim 1 wherein said circular tool is a sanding or griding tool with a downwardly facing surface which is to sand or grind protuberances extending upwardly from the floor, and wherein said means for adjustably mounting said motor and frame assembly upon said base member also securely adjustably supports said circular tool in a forward and downwardly inclining plane where the front edge portion of the sanding or grinding tool is at or below the plane of the bottom of said base member.

3. The portable machine tool unit of claim 2 wherein said circular tool has a conically shaped downwardly facing sanding or grinding surface so the surface makes portion of the machine tool unit, the horizontal spacing of the handles being such as to be positioned inwardly of the intersecting walls at the corner of a room when the circular tool is positioned to operate in the corner of the room.

18. The portable machine tool unit of claim 14 wherein there is provided a power circuit for the motor which includes two switches in series circuit relation, and said pair of handles being respectively provided with manually operable means respectively operated when the handles are grasped by the user for respectively closing said series connected switches, so the motor is not energized to rotate the circular tool only when one handle is grasped.

19. A portable machine tool unit comprising: a base member having a bottom wall for guiding the machine tool over a floor and a rear wall and side wall portions at least at the front of said base member; a frame vertically adjustably mounted within said base member and including a top wall, side walls contiguous to said side wall portions at the front of said base member, and a rear wall contiguous with the rear wall of said base member; a motor supported on said top wall of said frame and having a vertical spindle depending below the top wall of said frame; a circular generally horizontally extending cutting tool secured to the end of said spindle, releasable fastening means extending between said base member and said frame for securing the assembly of said motor and frame at a desired elevation where said circular tool has the proper spacing relative to the bottom surface of the bottom wall of said base member, said fastening means including means respectively extending between said side wall portions at the front of said base member and said side walls of said frame and terminating in locking means exposed on the outer side of said base member for locking the front end portion of the frame adjusted to the desired elevation thereof, and at least one means extending between the rear walls of said base member and frame and including locking means exposed on the outside of the rear wall of said base member for locking the rear portion of said frame adjusted to the desired elevation; and handle means to be grasped by the user for propelling the machine tool along said floor.

20. The portable machine tool unit of claim 19 wherein said motor and frame assembly when said locking means are moved to at least a partially released position is shiftable with respect to the base member to provide an adjustment of both the spacing of the front and rear portions of the frame with respect to the bottom wall of said base member and also to vary the relative elevation of the front and rear portions of said frame to tilt the angle of the motor spindle forwardly or rearwardly from the vertical.

21. The portable machine tool unit of claim 6 wherein there is provided means for preventing lateral tilting of said frame with respect to said base member.

22. The portable machine tool unit of claim 21 provided further with elevation adjusting means comprising a single screw means having a laterally centered head above the top wall of said frame and a threaded shank threading into said frame so the bottom thereof bears against the bottom wall of said base member, whereby the rotation of said screw means in one direction or the other will vary the vertical spacing between the frame and the base member.

23. A portable machine tool unit comprising: a base member guidable along a floor; a frame; a motor carried by the frame and having a depending spindle to be driven by the motor; a circular tool carried at the bottom of the spindle, the circular tool having a relatively narrow dimension axially of the spindle and extending generally transversely of the axis of the spindle; means adjustably mounting said assembly of the motor and frame upon said base member for vertical adjustment relative to said base member so said circular tool can selectively be securely positioned to extend in various planes, said adjusting means including vertically extending adjustable screw means threading through said frame and bearing against said base member so rotation of the screw means in one direction or the other will vary the spacing of said frame from the base member, and means for preventing significant lateral tilting of the frame comprising sprockets mounted for mutually coupled rotation about horizontal lateral axes on opposite sides of said frame so rotation of one sprocket will effect rotation of the other sprocket, said base member including laterally extending vertical wall means with vertically spaced openings into which the teeth of said sprockets extend.

24. The portable machine tool unit of claim 23 wherein said sprockets are mounted at the rear of said frame and said vertically spaced openings are located in a rear wall of said base member.

25. The portable machine tool unit of claim 1 wherein said circular tool is a circular saw blade having a central opening, a relatively rigid hub member secured to the inner surface of said circular saw blade and including a central opening aligned with said central opening of said circular saw blade and having within the central opening thereof an outwardly facing annular shoulder, and a mounting screw for anchoring the assembly of said circular saw blade and hub member to said spindle, said mounting screw having a head portion positioned in said central opening of said hub member and a shank portion threading into said spindle so the head portion of said mounting screw bears on said annular shoulder.

26. The portable circular saw unit of claim 25 wherein said hub member is removably secured to said circular saw blade.

27. The portable circular saw blade of claim 25 wherein said hub member is removably secured to said circular saw blade by circumferentially spaced screws.

28. A portable machine tool unit comprising: a base member guidable along a floor; a frame; a motor carried by the frame and having a depending spindle to be driven by the motor; a circular tool carried at the bottom of the spindle, the circular tool having a relatively narrow dimension axially of the spindle and extending generally transversely of the axis of the spindle; means adjustably mounting said assembly of the motor and frame upon said base member for vertical adjustment relative to said base member so said circular tool can selectively be securely positioned to extend in various parallel planes where the circular tool remains parallel to the floor, said adjusting means including only a single vertically extending adjustable screw threading through said frame and bearing against said base member so rotation of the screw in one direction or the other can vary the vertical spacing of the entire frame from the base member when the frame is completely free to move vertically, means for preventing significant lateral tilting of the frame during adjustment of said screw, and releasable anchoring means spaced from said screw for anchoring the adjacent portion of the frame to the base member.

29. A portable machine tool unit comprising: a base member having a bottom wall whose bottom surface is adapted to engage the floor; a frame; a motor carried by the frame and having a depending spindle to be driven by the motor; a circular tool carried at the bottom of the spindle, the circular tool having a relatively narrow dimension axially of the spindle and extending generally transversely of the axis of the spindle in front of said floor engaging surface; means adjustably mounting said assembly of the motor and frame upon said base member for vertical adjustment relative to said base member so said circular tool can selectively be securely positioned to extend in various parallel planes where the circular tool remains parallel to the floor, said adjusting means including vertically extending adjustable screw means extending through said frame and contacting said bottom wall of said base member behind said circular tool so rotation of the screw means in one direction or the other will vary the spacing of said frame from the base member while maintaining the parallel relationship of the circular tool relative to the floor.

30. The portable machine tool unit of claim 3 wherein said sanding or grinding surface of said circular tool is only slightly conically shaped so the downwardly facing sanding or grinding surface extends at an angle only a few degrees to a plane transverse to the axis of rotation thereof.

31. The portable machine tool unit of claim 1, wherein said circular tool is a flexible sanding or grinding tool, the outer face of said circular tool to be brought into close proximity to a surface extending generally parallel thereto, said circular tool having a central opening and a relatively rigid hub member which has a slightly conical outer face opposed to the inner face of said circular tool, means removably drawing said circular tool against said conical outer face of said hub member to give the same a similar conical shape, said hub member having a central opening aligned with said central opening of said circular tool and having within the said central opening thereof an outwardly facing annular shoulder, a means for anchoring the assembly of said circular tool and hub member to said spindle.

32. The portable machine tool unit of claim 29 wherein said adjusting means comprises only a single rotatable element.

References Cited
UNITED STATES PATENTS

| | | | |
|---|---|---|---|
| 2,952,281 | 9/1960 | Weber | 143—43 CX |
| 2,097,806 | 11/1937 | Weidrich | 51—177 X |
| RE. 21,180 | 8/1939 | Myers | 51—177 |
| 2,610,658 | 9/1952 | Koeling | 143—43 C |
| 2,753,493 | 7/1956 | Saives | 192—131 X |
| 3,331,409 | 7/1967 | Reed et al. | 143—43 RX |
| 2,630,151 | 3/1953 | Turnbull | 143—43 CX |
| 3,111,969 | 11/1963 | Bivens | 143—43 A |
| 2,242,229 | 5/1941 | Burleigh | 51—177 |
| 3,487,747 | 1/1970 | Burrows et al. | 144—134 D |

ANDREW R. JUHASZ, Primary Examiner

J. F. COAN, Assistant Examiner

U.S. Cl. X.R.

51—177, 180; 83—478; 144—119; 136 C; 192—131